Jan. 3, 1928.  
S. DE ORLO  
1,655,138  
STEERING COLUMN SUPPORT  
Filed Dec. 1, 1924
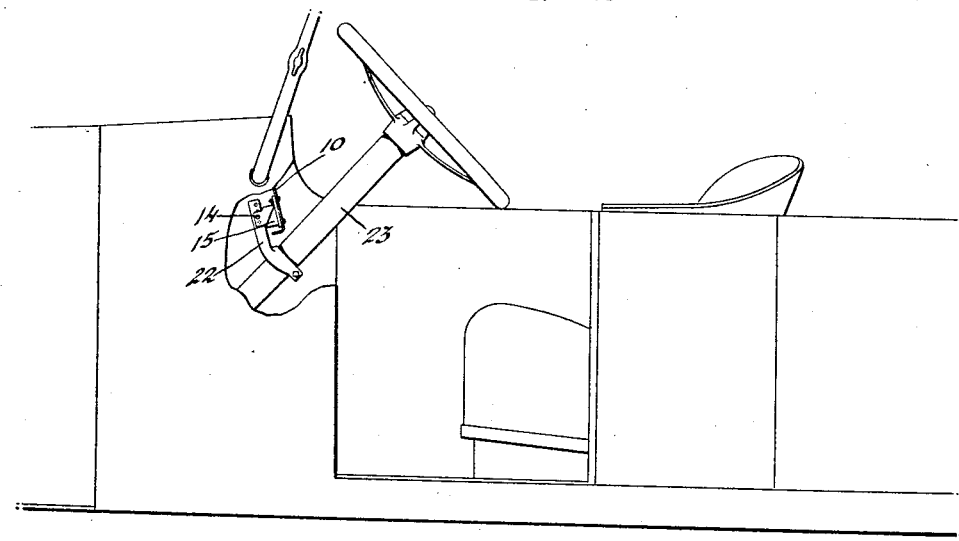
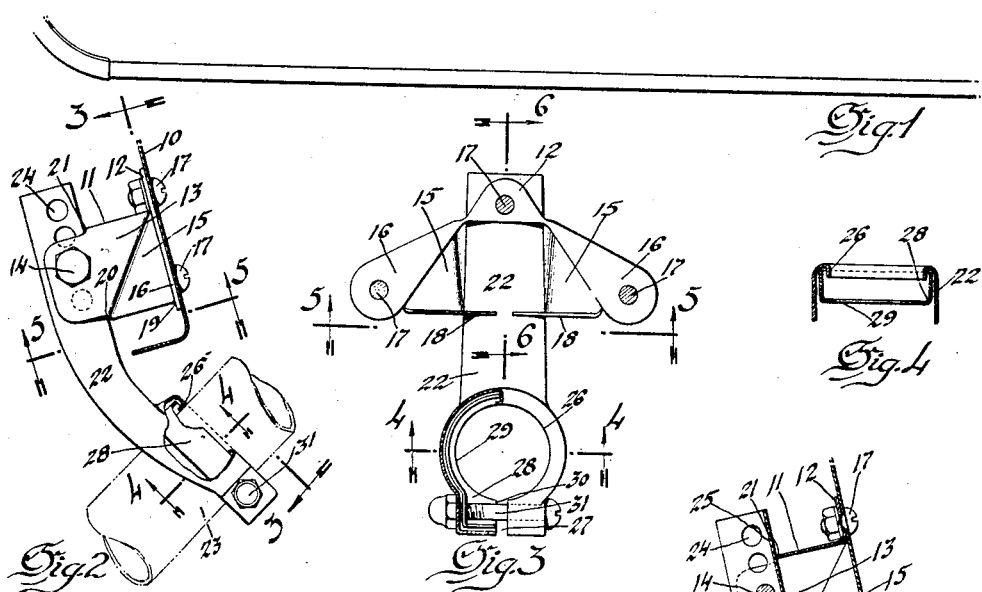
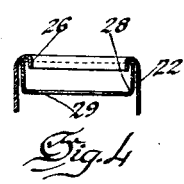
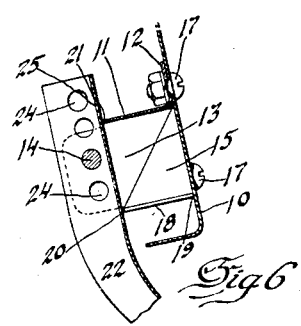
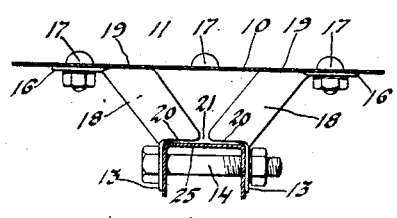
INVENTOR  
Stephen De Orlo  
BY  
Blackmore, Spencer & Hill  
ATTORNEYS Patented Jan. 3, 1928.

1,655,138

UNITED STATES PATENT OFFICE.

STEPHEN DE ORLO, OF LANSING, MICHIGAN, ASSIGNOR TO GENERAL MOTORS CORPORATION, OF DETROIT, MICHIGAN, A CORPORATION OF DELAWARE.

STEERING-COLUMN SUPPORT.

Application filed December 1, 1924. Serial No. 753,245.

My invention relates to supporting and bracing means for the steering columns or steering posts of motor driven vehicles; and the object thereof is to provide an improved adjustable steering column supporting device for automobiles whereby the column may be supported and held in various positions from the usual transversely extending dash or instrument board, which supports various instruments in view of the driver, to thereby locate the steering wheel at the upper end of the column in a position most convenient for the operator of the vehicle.

The drawing accompanying and forming a part of this application illustrates the preferred form of my invention; although it may be embodied in various other forms, and the patent to be secured therefor is intended to include all such variations and modifications of the particular form thereof illustrated and described herein as come within the scope of the concluding claims, in which the distinguishing features wherein my invention consists are particularly pointed out.

In the drawing:

Figure 1 is a fragmentary view showing an automobile equipped with my improved adjustable steering post supporting device.
Figure 2 is a view upon a considerably larger scale than Figure 1 showing my invention mainly in side elevation, but broken away in places to show features otherwise hidden.
Figure 3 is a view showing my invention as seen from inclined planes perpendicular to the drawing and indicated by the broken line 3, 3, Figure 2.

Figure 4 is a view showing a section upon a similar plane indicated by the lines 4, 4, Figures 2 and 3.

Figure 5 is a view showing a section upon a plane indicated by the lines 5, 5, Figures 2 and 3.
Figure 6 is a view showing a section upon a plane indicated by the line 6, 6, Figure 3.

Referring now to the drawing, my invention includes a bracket adapted to be fastened to the surface which is not visible of the usual transversely extending instrument board 10 of an automobile, which surface is hereinafter referred to as the front side of the instrument board; said bracket being formed from a suitably shaped sheet metal blank bent to provide an upper wall 11 having an outwardly bent attaching lug 12 extending at right angles therefrom; and two side walls 13, 13 extending from the instrument board and the base of the bracket beyond the limits of said upper wall to provide supports in the form of projecting ears for a bolt 14, and which walls preferably diverge, as indicated at 15, and likewise have outwardly bent lugs 16, 16 whereby the bracket may be fastened to the instrument board by bolts 17. The blank has also two portions which in the finished bracket lie beneath and extend inwardly toward one another to provide abutments 18, 18 lying beneath the wall 11 and having lower edges 19 lying substantially in the plane of the attaching lugs 12, 16, 16 and upper edges 20 which lie in a plane substantially parallel with the base of the bracket (comprising the lugs 12, 16, 16) and extending parallel with the free edge 21 of the top wall 11.

The two free edges 20, 20 are in line with one another, and both of them and the free edge 21 of the wall 11 lie all in one plane which is substantially parallel with the base of the bracket and with the instrument board, and which plane is spaced apart from the board a distance corresponding with the height of the said wall 11; and the numeral 22 designates a steering post support the upper end of which lies in between ears provided by extending portions of the side walls 13, 13, and the lower end of which serves to support the steering column or post 23 of the vehicle. The upper end of the column supporting member 22 abuts against the edges 20, 20 and 21; and the same is held to the bracket by the bolt 14 which may extend through various holes 24 in the post support, to thereby provide for adjustment of said member as a whole up and down.

The supporting member is also preferably made from a suitably shaped sheet metal blank bent and shaped into channel form; the bottom wall of the channel (designated by the numeral 25) resting against the edges 20, 20 and 21, as best shown in Figure 6, whereby said edges serve as stops which act to prevent oscillation of the said member about the bolt 14, while the side walls of the said column support in which the holes 24 are formed engage the inner surfaces of the supporting ears extending from the side walls 13; the bracket thus serving to support the column support 22 from the instrument board 10 through the side walls 13 and bolt 14 in a firm and steady manner, as will be understood.

The lower end of the column supporting member 22 extends at an angle to the upper portion, and is widened in the example thereof illustrated; and a circular seat is formed in the web portion of said member as indicated at 26, preferably by bending a portion of the web inward to thereby provide an extensive bearing surface and prevent abrasion of the steering post, which lies within said seat.

The lower extremity of the column support is split as at 27; and the numeral 28 resignates a clamping ring lying within the channel of the column support at the lower end thereof, and having an annular seat at 29 corresponding in diameter with that of the seat 26. This clamping ring is also split as at 30; and the same fits closely within the channel of the column support, particularly at the split portions of said members, so that both the column support and the ring may be forced into clamping engagement with the steering column by a single bolt 31 extending through holes in said members, at the places where they are split by the cuts 27, 30.

In view of the premises it will be appreciated that upon removal of the bolt 14 the column supporting member 22 may be moved up or down to adjust the steering wheel, to suit the convenience of the driver of the vehicle, and that the bolt upon being reinserted in the proper pair of holes 24 and tightened will clamp the column supporting member between the ears which support the bolt; and that when the column supporting member is fastened to the bracket it will be restrained from angular movement upon the said bolt 14 by the abutments provided by the edges 20, 20 and 21. The nut of the bolt 31 should be loosened prior to adjusting the column support 22 up or down in order that slight movement between the column and the seats 26 and 29 during adjustment of the parts may occur, and tightened when the steering wheel has been properly positioned to thereby more firmly hold the steering column in its proper position, as will be appreciated.

Having thus described and explained my invention, I claim and desire to secure by Letters Patent:

1. In a steering column supporting and adjusting device and in combination with the transversely extending instrument board of an automobile, a bracket fastened to the front side of said board and which bracket is provided with stops for preventing swinging movement of a supporting member; a vertically adjustable steering column support the upper end of which lies in engagement with said stops, and the lower end of which is adapted to engage and support a steering column; and means for fastening the upper end of said supporting member to said bracket.

2. In a steering column supporting and adjusting device of the class described, a bracket and means for fastening it to an instrument board or equivalent support, and which bracket is provided with laterally spaced ears, and with vertically spaced stops between said ears for preventing swinging movement of a supporting member; a vertically adjustable steering column support the upper end of which lies between said ears and in engagement with the stops aforesaid, and the lower end of which is adapted to engage and support a steering column; and a bolt extending through holes in said ears and in said supporting member to thereby fasten the upper end of said member to said bracket.

3. In a steering column supporting and adjusting device of the class described, a bracket and means for fastening it to an instrument board or equivalent support, and which bracket is provided with laterally spaced ears, and with vertically spaced stops between said ears for preventing swinging movement of a supporting member; a vertically adjustable steering column support channel shaped in cross section and the upper end of which lies between said ears, with the web thereof in engagement with the stops aforesaid, and the lower end of which support is shaped to provide a circular seat for receiving and supporting a steering column; and a bolt extending through aligned holes in said ears and in the sides of said channel shaped supporting member to thereby fasten the upper end of said member to said bracket.

4. In a steering column supporting device and in combination with the transversely extending instrument board of a motor driven vehicle, a bracket fastened to the front side of said board and which bracket is provided with stops for preventing swinging movement of a supporting member; a steering column support channel shaped in cross section and the upper end of which is secured to said bracket with the web portion thereof in engagement with said stops, and the lower end of which support is disposed at an angle to the upper portion and is so shaped as to provide a split circular seat for receiving and supporting a steering column; and a bolt for contracting said seat to thereby cause it to clamp a steering column supported by said supporting member.

5. In a steering column supporting device and in combination with the transversely extending instrument board of a motor driven vehicle, a bracket fastened to the front side of said board; a steering column support the upper end of which is secured to said bracket, and the lower end of which is disposed at an angle to the upper portion, and is split and shaped to provide a circular seat for receiving and supporting a steering column; a split clamping member at the lower end of said column support and having a circular seat of substantially the same diameter as said first mentioned seat; and a bolt for contracting both said seats into engagement with a steering column.

6. In a steering column supporting device and in combination with the transversely extending instrument board of a motor driven vehicle, a bracket fastened to said board; a steering column support channel shaped in cross section and the upper end of which is secured to said bracket, and the lower end of which is disposed at an angle to the upper portion and is provided with a split circular seat in its web for receiving and supporting a steering column; a split clamping member arranged within the lower end of said column support and having a circular seat of substantially the same diameter as said first mentioned seat; and a bolt extending through aligned holes in said clamping member and column support for contracting said seats into engagement with a steering column.

7. In a steering column supporting device of the class described, a bracket having an upper wall with a free edge, and an attaching lug at its base; two side walls having each an attaching lug at its base and in the same plane as the plane of said first mentioned lug, and which side walls extend beyond the free edge aforesaid to provide spaced ears; and two abutments extending toward one another and spaced apart from and lying beneath said upper wall; the lower edges of said abutments lying substantially in the plane of said several attaching lugs, and the upper edges thereof lying substantially in the plane of the free edge of said upper wall; a steering column support the upper end of which lies between said ears and in engagement with the upper edges of said abutments, and with the free edge of the upper wall of said bracket, and the lower end of which support is adapted to engage and support a steering column; and a bolt extending through the ears aforesaid and through said steering column to fasten it to said bracket.

In testimony whereof I affix my signature.

STEPHEN DE ORLO.